Jan. 19, 1937.  H. J. LOUNSBURY  2,068,556
HAND BRAKE
Filed Dec. 21, 1934
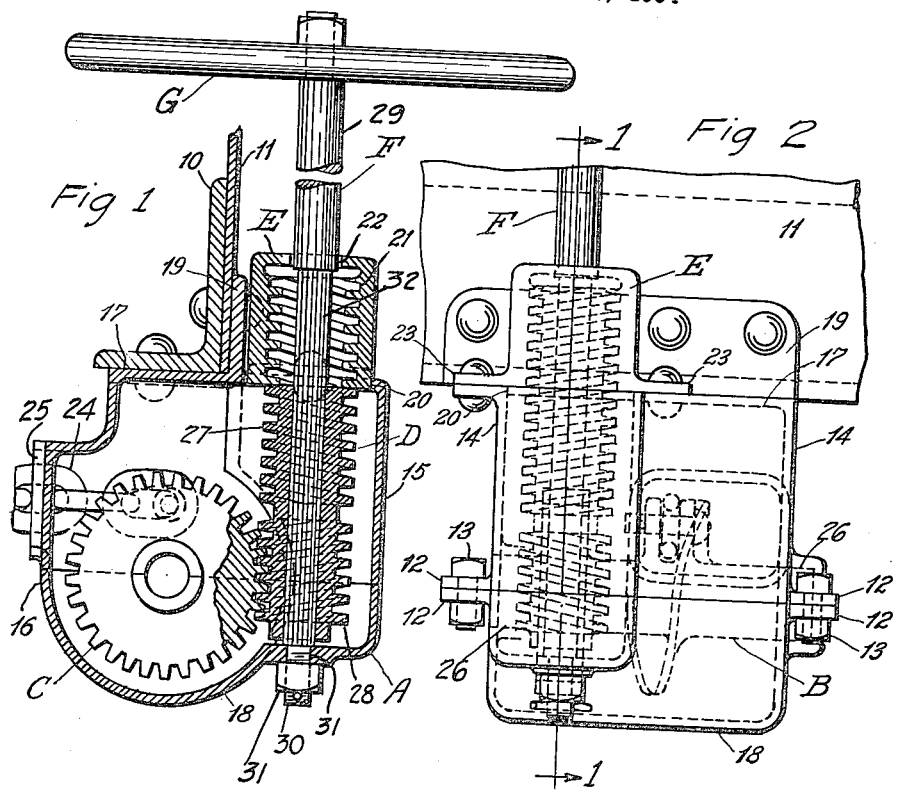
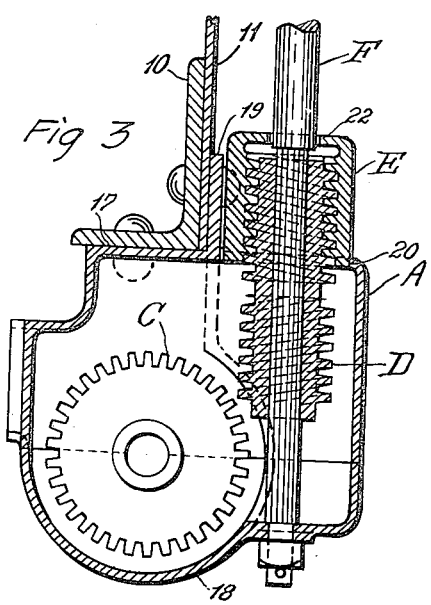
Inventor
Harvey J. Lounsbury
By Henry Fuchs Atty.

UNITED STATES PATENT OFFICE 2,068,556

HAND BRAKE

Harvey J. Lounsbury, Glen Ellyn, Ill., assignor to W. H. Miner, Inc., Chicago, Ill., a corporation of Delaware Application December 21, 1934, Serial No. 758,540

15 Claims. (Cl. 74—505)

This invention relates to hand brakes especially adapted for use in connection with railway cars.

One object of the invention is to provide a hand brake mechanism of simple design, including a chain winding means, wherein the power is greatly multiplied during application of the brakes and wherein means is provided for automatically disconnecting the actuating member from the winding means after a predetermined backing off of the brakes to permit free rotation of the winding means to quickly and completely release the brakes, without further movement of the actuating means.

Another object of the invention is to provide a power hand brake of the worm gear driven type, comprising a winding drum operated by means of a worm wheel connected to the drum and a rotatable worm element engageable with the worm wheel, and rotary means for actuating the worm element, wherein engagement of the worm element and the worm wheel and disengagement of said worm element and wheel are automatically effected by operation of the rotary actuating means.

A further object of the invention is to provide a brake mechanism of the character specified in the preceding paragraph, wherein the engagement of the worm element with the worm wheel is automatically effected immediately upon rotation of the actuating means in brake tightening direction, and wherein disengagement of the worm element and worm wheel is automatically effected by rotation of the actuating means in releasing direction after a predetermined partial backing off of the brakes.

A more specific object of the invention is to provide a manually actuated brake mechanism, comprising a chain winding drum having a worm wheel connected thereto for rotating the same; a worm element adapted to mesh with the worm wheel; and manually actuated rotary means for operating the worm element, wherein means controlled by rotation of the manually actuated means is provided for moving the worm axially in reverse directions to respectively engage and disengage the worm element and worm wheel, said means for moving the worm being rendered inoperative after a predetermined initial winding take-up of the chain and during the complete tightening of the brakes during rotation of the manually actuated means in brake tightening direction, said means for moving the worm being again rendered inoperative upon rotation of the manually actuated means in brake releasing direction to completely disengage said worm element from the worm wheel after a predetermined backing off and partial release of the brakes to permit free rotation of the chain winding drum to complete the releasing action of the brakes and allow complete unwinding of the chain from the drum.

Yet another object of the invention is to provide a power hand brake mechanism of the worm gear driven type, comprising a worm wheel connected to the chain winding drum of the brake for rotating the drum; a rotary worm element having a set of threads engageable with the worm wheel for actuating the latter; and manually operated rotary means for rotating the worm element, wherein the worm element is automatically engaged with the worm wheel upon rotation of the manually operated means in brake tightening direction and is automatically disengaged from said worm wheel upon rotation of the manually operated means in brake releasing direction, said disengagement being effected after a predetermined partial backing off of the brakes, said automatic operation of the worm element being produced by a screw means, comprising a fixed nut and an additional set of threads on the worm element cooperating with the nut, the two sets of threads of said worm element being the reverse of each other, that is, right and left.

Other objects of the invention will more clearly appear from the description and claims hereinafter following.

In the drawing, forming a part of this specification, Figure 1 is a vertical sectional view through my improved hand brake mechanism, corresponding substantially to the line 1—1 of Figure 2, but showing certain parts in elevation, the brake mechanism being illustrated as mounted on the end of a car, the car being only partially shown. Figure 2 is an elevational view of the hand brake mechanism illustrated in Figure 1, said view being partly broken away. Figure 3 is a view, similar to Figure 1, illustrating the operating mechanism in another position, the brake staff being broken away and the operating hand wheel being omitted.

In said drawing, 10 indicates a portion of the end sill member of a railway car, and 11 a portion of the end wall of said car. My improved hand brake mechanism is contained within a housing secured to the end sill 10.

The improved brake mechanism comprises broadly a housing A; a chain winding drum B; a wormwheel C fixed to the drum; a right and left threaded worm element D; a fixed internal threaded cap or nut E; a vertical shaft or staff F; and a hand wheel G.

The housing A is preferably made of upper and lower sections having registering flanges 12—12 and 12—12, which are secured together by bolts 13—13 or any other well-known type of securing means. The housing A has spaced side walls 14—14, spaced front and back walls 15 and 16, and horizontally disposed, spaced top and bottom walls 17 and 18. The top wall is provided with an upstanding flange 19 by means of which the brake mechanism is secured to the end sill 10 of the car. As shown, rivets extending through the vertical flange of the end sill 10, the end wall 11 of the car, and the flange 19 of the housing A, are employed to secure the housing in place. Similar rivets may also be provided to secure the top wall of the housing to the bottom flange of the end sill, as indicated in Figures 1 and 3. The top wall 17 of the housing is also provided with an opening 20 into which the lower end portion of the cap or nut E extends. The cap or nut E is internally threaded, as indicated at 21, said threads being right handed. The top wall of the cap E is provided with a circular bearing opening 22 which accommodates a portion of the staff F, as hereinafter more fully described. The cap is fixed to the top wall of the housing, the same being provided with bottom flanges 23—23 at opposite sides thereof. The flanges are fixed to the top wall 17 of the housing A by means of rivets or other securing elements, extending through said flanges and said top wall.

The chain winding drum B and the worm wheel C are preferably in the form of a single member. As shown in the drawing, this member is provided with the usual chain winding drum section B having the brake chain 24 secured thereto. The brake chain 24 extends through an opening 25 in the back wall 16 of the housing A and is connected to the brake rigging of the car in the usual manner. The member forming the winding drum and worm wheel has cylindrical bearing portions 26—26 at opposite ends thereof which are rotatably journaled in suitable bearings provided in the side walls of the housing A.

The worm element D is provided with two sets of threads 27 and 28, as clearly shown in Figures 1 and 3. The threads 27 are right hand so as to properly cooperate with the threads of the nut E, and the threads 28 are preferably left hand so that the chain winding drum B will be rotated in a clockwise direction, as viewed in Figure 1, when the brakes are being applied. The left hand threaded section 28 of the worm element D is preferably shorter than the right hand threaded section 27, for a purpose hereinafter pointed out. The worm element D is supported on the brake staff F, which is in the form of a vertically disposed shaft having a hand wheel G fixed to the upper end thereof. The upper end section 29 of the shaft F is cylindrical in form and extends into and has bearing engagement within the opening 22 in the top wall of the cap E. The extreme lower end portion of the shaft F is also cylindrical, as indicated at 30, and has bearing engagement within a cylindrical bearing opening 31 in the bottom wall 18 of the housing A. The cylindrical end portion 30 of said shaft projects beyond the bottom wall and is threaded, as indicated, to receive a nut 31 which is employed to prevent upward displacement of said shaft. Between the cylindrical portions 29 and 30, the shaft F is of square cross section, as indicated at 32. This portion of square cross section slidably fits within a square opening extending lengthwise through the worm element D.

The fully released position of the brake mechanism is illustrated in Figure 3, and as will be evident the worm wheel C and the brake chain winding drum B are free to rotate. In applying the brakes, the hand wheel G is rotated in a right hand direction, thereby rotating the shaft F and the worm element D. Inasmuch as the threads 27 of the worm element D are at this time in engagement with the threads of the nut E, rotation of the worm will cause the same to slide downwardly on the square section of the shaft F while being rotated. As the worm element D is thus advanced along the shaft F, the threads 28 will be brought into engagement with the threads of the worm wheel C. Immediately upon engagement of these threads, rotation of the worm wheel C and the chain winding drum B will be effected, thereby winding the chain 24 on the drum. As rotation of the shaft D is continued, in said chain winding direction, the threaded section 27 of the worm element D will be completely unscrewed from the nut E until the worm element D assumes the position shown in Figure 1. As will be obvious, during this last described portion of the operation, the rotation of the chain winding drum will be continued. During further rotation of the worm element E, after the same has been disengaged from the threads of the nut E, the worm element will be held in the position shown in Figure 1 while being rotated, due to the right hand threads on the nut E preventing entrance of the threads of the section 27 into said nut. Complete application of the brakes is effected by further rotation of the worm element while positioned on the shaft F as shown in Figure 1. As will be evident, due to the action of the left hand threads 28 on the threads of the worm wheel C, the chain winding drum is rotated in a clockwise direction, as viewed in Figure 1, while the brakes are being applied, and the pull on the brake chain during application of the brakes and after the brakes have been fully set will be in a direction to exert an upward thrust on the worm element D, thereby holding the upper end portion of the right hand threaded section 27 of said worm element in engagement with the bottom of the nut E.

In releasing and backing off the brakes, the hand wheel G is rotated in a left hand direction. Inasmuch as the thrust on the worm element D is upward, engagement of the threads 27 of said worm element with the threads of the nut E is assured during a left hand rotation of the hand wheel G. As the worm element D is rotated in brake releasing direction, the section 27 of said worm element will be screwed into the nut E, thereby lifting the worm element D while being rotated. During this lifting action of the worm element D, the worm wheel C will be rotated in a left hand direction, as viewed in Figure 1, due to the upward travel of the threaded section 28. At the same time the rotation in a left hand direction of the worm wheel C will be augmented due to the rotation of the worm element D. Unwinding of the chain from the drum is thus effected, thereby producing the desired releasing or back off action of the brake mechanism. Inasmuch as the threaded section 28 of the worm element D is shorter than the threaded section 27 thereof, the threads 28 will be completely disengaged from the worm wheel C when the threaded section 27 is screwed into the nut E to the extent shown in Figure 3. The worm wheel C and the chain winding drum B are thus left free to rotate and permit quick complete release of the brake mechanism through unwinding of the chain 24 from the drum.

From the preceding description taken in connection with the drawing, it will be evident that I have provided a simple and efficient brake mechanism by means of which the brakes may be fully applied and either partially backed off and reapplied without complete release, or quickly completely released. A decided advantage of my improved hand brake mechanism is that it protects the brakeman against injury because there is no possibility of the hand wheel spinning or rotating backwardly through the releasing action of the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary tightening element; of a worm wheel member operatively connected to said element for rotating the same; a fixed threaded member; an axially displaceable rotary worm member having right and left threads thereon, one of said threads being engageable with the worm wheel and the other of said threads being engageable with the fixed threaded member; and manually operated means for rotating said worm member.

2. In a hand brake mechanism, the combination with a worm wheel; of a rotary tightening element rotatable with said worm wheel; an axially displaceable rotary worm member having right and left threads thereon, one of said threads being normally in engagement with the threads of the worm wheel; and a fixed threaded member with which the other thread of said worm member is engageable upon rotation of said worm member in brake releasing direction to displace said worm axially to disengage the same from the worm wheel.

3. In a hand brake mechanism, the combination with a worm wheel; of a rotary tightening element rotatable with said worm wheel; an axially displaceable rotary worm member having right and left threads thereon, one of said threads being normally in engagement with the threads of the worm wheel; and a threaded member engageable by the other of the threads of said worm member when the latter is rotated in brake releasing direction to withdraw the same from engagement with the worm wheel.

4. In a hand brake mechanism, the combination with a worm wheel; of a rotary tightening element rotatable with said worm wheel; an axially displaceable worm member having right and left threads thereon, one of said threads normally engaging the threads of the worm wheel; and a fixed internally threaded member on the end of which the end of the other thread of said worm member normally bears and with which said last named thread is adapted to engage to withdraw said worm in axial direction from engagement with said worm wheel, when said worm member is rotated in brake releasing direction.

5. In a hand brake mechanism, the combination with a worm wheel; of a rotary tightening element rotatable with said worm wheel; an axially displaceable rotary worm member having right and left threads thereon, one of said threads normally engaging the threads of said worm wheel; and a nut with which the other thread of said worm is engageable, the end of said last named thread normally bearing on the end of the nut, said last named thread being screwed into the nut when said worm is rotated in brake releasing direction to displace said worm member axially and withdraw said worm member from engagement with the worm wheel, said worm member being unscrewed from the nut and displaced axially in a reverse direction when said worm member is rotated in brake tightening direction to reengage the worm and the worm wheel.

6. In a hand brake mechanism, the combination with a worm wheel; of a rotary tightening element rotatable with said worm wheel; an axially displaceable worm member having right and left threads; a fixed nut on the end of which the end of one of said threads of the worm member bears, and into which said thread is screwed upon rotation of the worm member in brake releasing direction, and from which said thread is unscrewed when the worm member is rotated in brake tightening direction, the other thread of said worm being of a length to mesh with the thread of the worm wheel when said worm member is disengaged from the nut and while said worm member is being screwed into and out of the nut and to disengage from the threads of said worm wheel when the worm member is screwed into said nut to a predetermined extent to permit free rotation of the tightening element in brake releasing direction; and manually operated means for rotating said worm member in brake tightening and releasing directions.

7. In a hand brake mechanism, the combination with a worm wheel; of a rotary tightening member rotatable with the worm wheel; a fixed nut; a manually actuated rotary operating member; and a rotary element actuated by said operating member, said element having a threaded worm section cooperating with the worm wheel threads and a second threaded section cooperating with the nut, said second named threaded section being of greater length than the first named threaded section, the threads of one of said sections being right hand and the threads of the other section being left hand.

8. In a hand brake mechanism, the combination with a worm wheel; of a rotary tightening member rotatable with the worm wheel; a fixed right threaded nut; a rotary and axially movable worm member having a right threaded section engageable with the threads of the nut, and a left threaded section engageable with the threads of the worm wheel; and means for rotating the worm member.

9. In a hand brake mechanism, the combination with a worm wheel; of a rotary tightening member rotatable with the worm wheel; a fixed right threaded nut; a rotary and axially movable worm element having a right threaded section engageable with the threads of the nut, and a left threaded section engageable with the threads of the worm wheel, said right threaded section of the worm element being of greater length than said left threaded section; and means for rotating the worm element.

10. In a hand brake mechanism, the combination with a worm wheel; of a rotary tightening element rotatable with the worm wheel; a fixed right threaded nut member; a rotary and axially movable worm element, said worm element having a left threaded section engageable with the threads of the worm wheel, said left threaded section being normally engaged with the threads of the worm wheel and being of a length to remain in engagement with the worm wheel threads while said worm element is moved a predetermined distance in said axial direction, and to be disengaged from said worm wheel when moved beyond said predetermined distance, said worm element also having a right hand threaded section adapted to be engaged within the threads of the nut, said right hand threaded section being screwed into the nut when said worm is rotated in brake releasing direction to move said worm axially to and beyond said predetermined extent, and being completely unscrewed from the nut when said worm element is rotated in brake tightening direction to move said element axially to reengage the left threads thereof with the worm wheel and maintain said threads engaged during complete application of the brakes, the arrangement of right threads of the worm and nut preventing engagement of said threads during rotation of the worm in brake tightening direction; and manually operated means for rotating said worm element.

11. In a hand brake mechanism, the combination with a worm wheel; of a rotary tightening element rotatable with the worm wheel; a fixed nut member; a rotary and axially movable worm element, said worm element having a threaded section engageable with the threads of the worm wheel, said threaded section being normally engaged with the threads of the worm wheel and being of a length to remain in engagement with the worm wheel while said worm element is moved a predetermined distance in said axial direction, and to be disengaged from said worm wheel threads when moved beyond said predetermined distance, said worm also having a second threaded section adapted to engage with the threads of the nut, one of said threaded sections being right hand and the other being left hand, said second named section being screwed into the nut when said worm is rotated in brake releasing direction to move said worm axially to and beyond said predetermined extent, and being unscrewed from the nut when said worm element is rotated in brake tightening direction to move said worm axially to reengage the threads of the first named section with the threads of the worm wheel and maintain said threads engaged during said unscrewing operation and after said threads of the second named section have been completely unscrewed to effect complete application of the brakes, the arrangement of the cooperating threads of the nut and worm element being such as to prevent reengagement of said threads during rotation of the worm element in brake tightening direction; and manually operated means for rotating said worm.

12. In a hand brake mechanism, the combination with a worm wheel; of a rotary tightening element rotatable with the worm wheel; a nut member; a rotary and axially movable worm element, said worm element having a threaded section engageable with the threads of the worm wheel, said threaded section being normally engaged with the threads of the worm wheel and being of a length to remain in engagement with the worm wheel while said worm element is moved a predetermined distance in said axial direction, and to be disengaged from said wheel threads when moved beyond said predetermined distance, said worm also having a second threaded section engaged with the threads of the nut, one of said threaded sections being right hand and the other being left hand, said threads of the second named section being screwed into the nut when the worm is rotated in brake releasing direction to move said worm element axially to and beyond said predetermined extent, and being screwed outwardly of the nut when said worm is rotated in brake tightening direction to move said worm axially to reengage the threads of the first named section with the threads of the worm wheel and maintain said threads engaged during complete application of the brakes; and manually operated means for rotating said worm element.

13. In a hand brake mechanism, the combination with a rotatable shaft; of a worm rotatable with the shaft and slidable thereon, said worm having right and left threads thereon; a winding drum having a worm wheel normally in engagement with one of said threads of the worm; a fixed nut having an internal thread adapted to prevent entrance of the other thread of the worm element when the worm is rotated by said shaft in a direction to apply the brakes and effect engagement of said last named threads to effect withdrawal of said worm element with respect to the worm wheel when the shaft is rotated to release the brakes.

14. In a hand brake mechanism, the combination with a rotatable brake staff having a square portion; of a worm element non-rotatable and reciprocably mounted on the square portion of said staff, said worm having a right threaded section and a left threaded section; a winding drum having a worm wheel normally engageable with the left threaded section of said worm element; and a fixed nut having an internal thread adapted to prevent entrance of the other of said threaded sections of said worm element when the latter is rotated in direction to set the brakes, and engage with said last named threaded section to effect withdrawal of said worm element with respect to said worm wheel when the staff is rotated to release the brakes.

15. In a hand brake mechanism, the combination with a brake staff and a winding drum; of worm elements rotatable with the staff and said drum respectively, one of said elements having right and left threads; and means having shouldered engagement with one of said threads to maintain engagement of said elements to effect rotation of said drum when the staff is rotated in one direction, said means having threaded engagement with said last named thread through rotation of said staff in the reverse direction to withdraw the right and left threaded element from operative engagement with the cooperating worm element to effect quick release of the brakes.

HARVEY J. LOUNSBURY.